United States Patent [19]

Offer

[11] Patent Number: 5,714,735
[45] Date of Patent: Feb. 3, 1998

[54] METHOD AND APPARATUS FOR JOINING COMPONENTS WITH MULTIPLE FILLER MATERIALS

[75] Inventor: Henry Peter Offer, Los Gatos, Calif.

[73] Assignee: General Electric Company, San Jose, Calif.

[21] Appl. No.: 671,787

[22] Filed: Jun. 20, 1996

[51] Int. Cl.⁶ .................................................. B23K 9/167
[52] U.S. Cl. .................................. 219/136; 219/75
[58] Field of Search ................... 219/136, 137.7, 219/137 PS, 74, 75, 76.11, 125.11, 125.12

[56] References Cited

U.S. PATENT DOCUMENTS

| | | | |
|---|---|---|---|
| 3,274,371 | 9/1966 | Manz et al. | 219/137.7 |
| 3,746,833 | 7/1973 | Ujiie | 219/74 |
| 3,924,092 | 12/1975 | Lessmann et al. | 219/76.11 |
| 3,940,586 | 2/1976 | Stearns et al. | 219/136 |
| 4,649,250 | 3/1987 | Kazlauskas | 219/125.11 |
| 5,149,939 | 9/1992 | Imaizumi et al. | 219/125.12 |
| 5,428,198 | 6/1995 | Peigney et al. | 219/125.11 |

FOREIGN PATENT DOCUMENTS

| | | | |
|---|---|---|---|
| 58-181472 | 10/1983 | Japan | 219/75 |
| 60-191677 | 9/1985 | Japan | 219/74 |
| 62-263868 | 11/1987 | Japan | 219/137 PS |
| 1-306073 | 12/1989 | Japan | 219/137.7 |

*Primary Examiner*—Clifford C. Shaw
*Attorney, Agent, or Firm*—James E. McGinness; Dennis M. Flaherty

[57] ABSTRACT

A multiple-filler-material guide nozzle assembly for feeding multiple fusible filler metal wire or other metal forms into reduced-width, high-aspect-ratio (ratio of depth to width) metallic joints with control and stability of the filler metal position as it enters the molten pool area. The multiple filler materials are fed concurrently at the same or different feed rates. To control the aiming consistency for each of the multiple fillers even with substantial amounts of "cast" in the filler shape (after being unwound from a spool), the nozzle holes can be curved to match the curvature of the "cast" filler wire. This forces the curved filler wire to consistently follow the predetermined orientation of the curved shape of the nozzle. The multiple nozzles can be used to compensate for weld dilution effects by alloying to generate more favorable uniform, gradient or stepped compositions in joints or cladding. These various composition configurations can be achieved by feeding variable rates of two or more different alloys into the joint. The multiple nozzles can also be used to deliver additives to the weld pool, such as powders for alloying effects including in-situ alloying with noble metal catalytic elements (e.g. palladium) or enrichment with SCC-resistant elements (e.g., chromium).

21 Claims, 10 Drawing Sheets

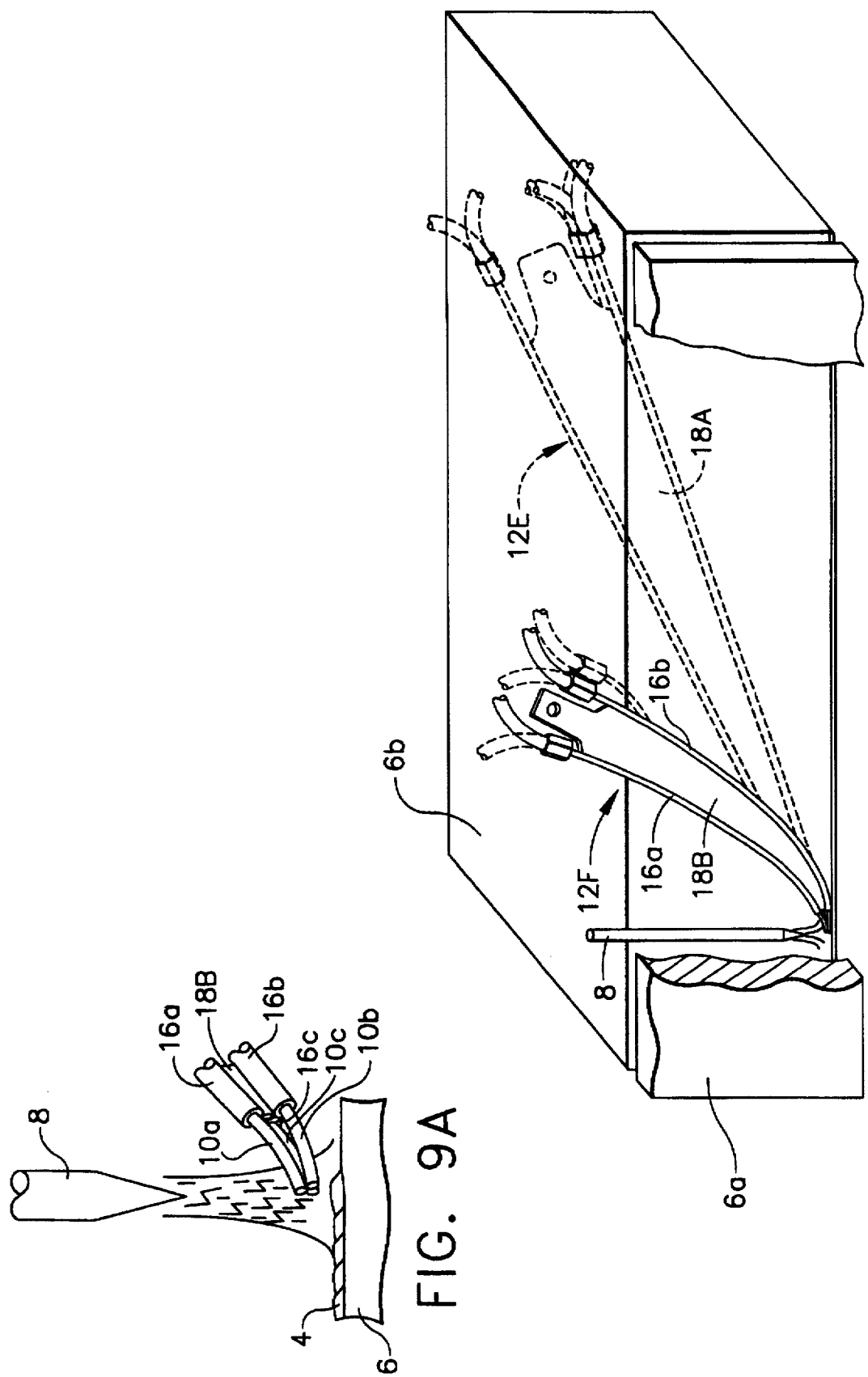

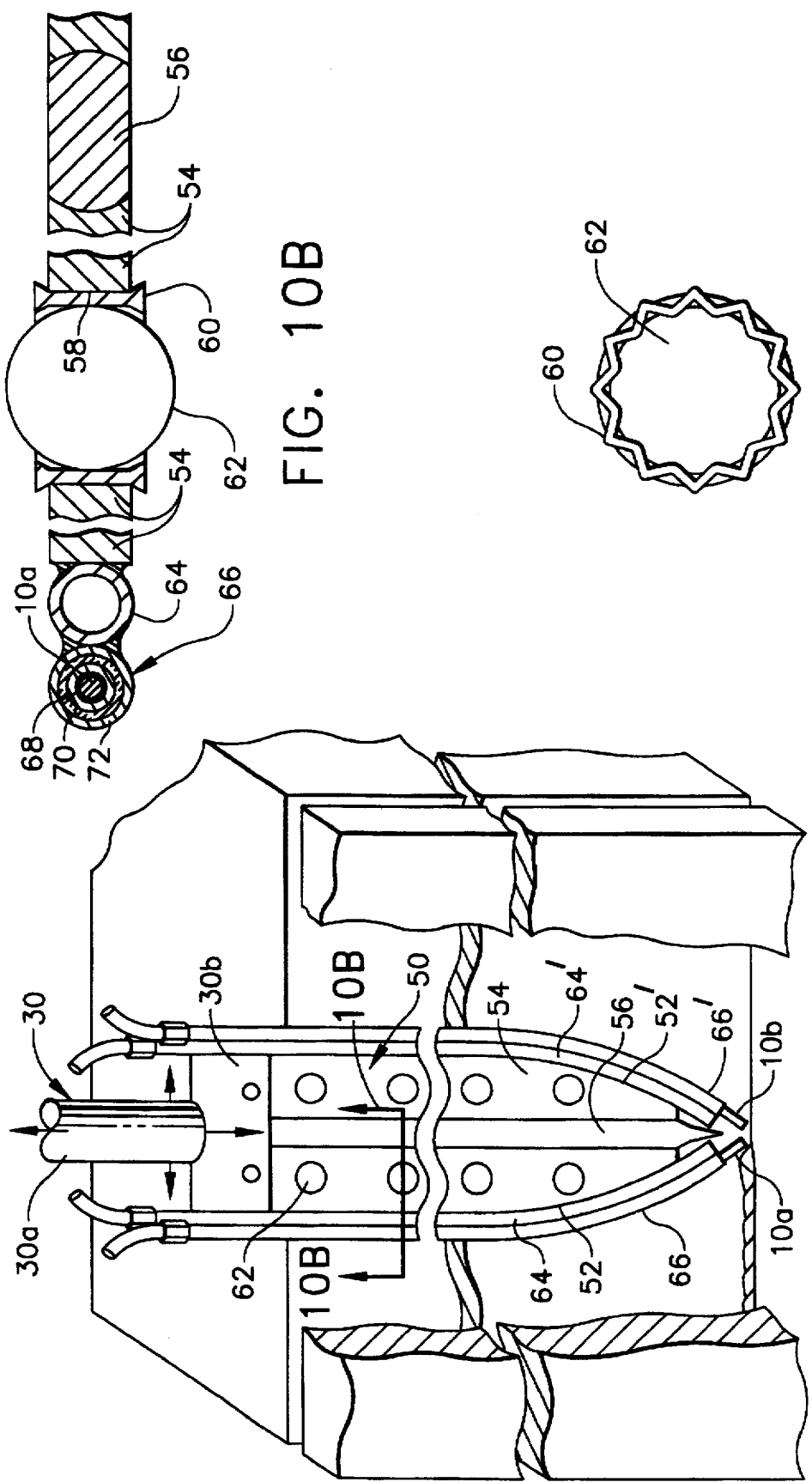

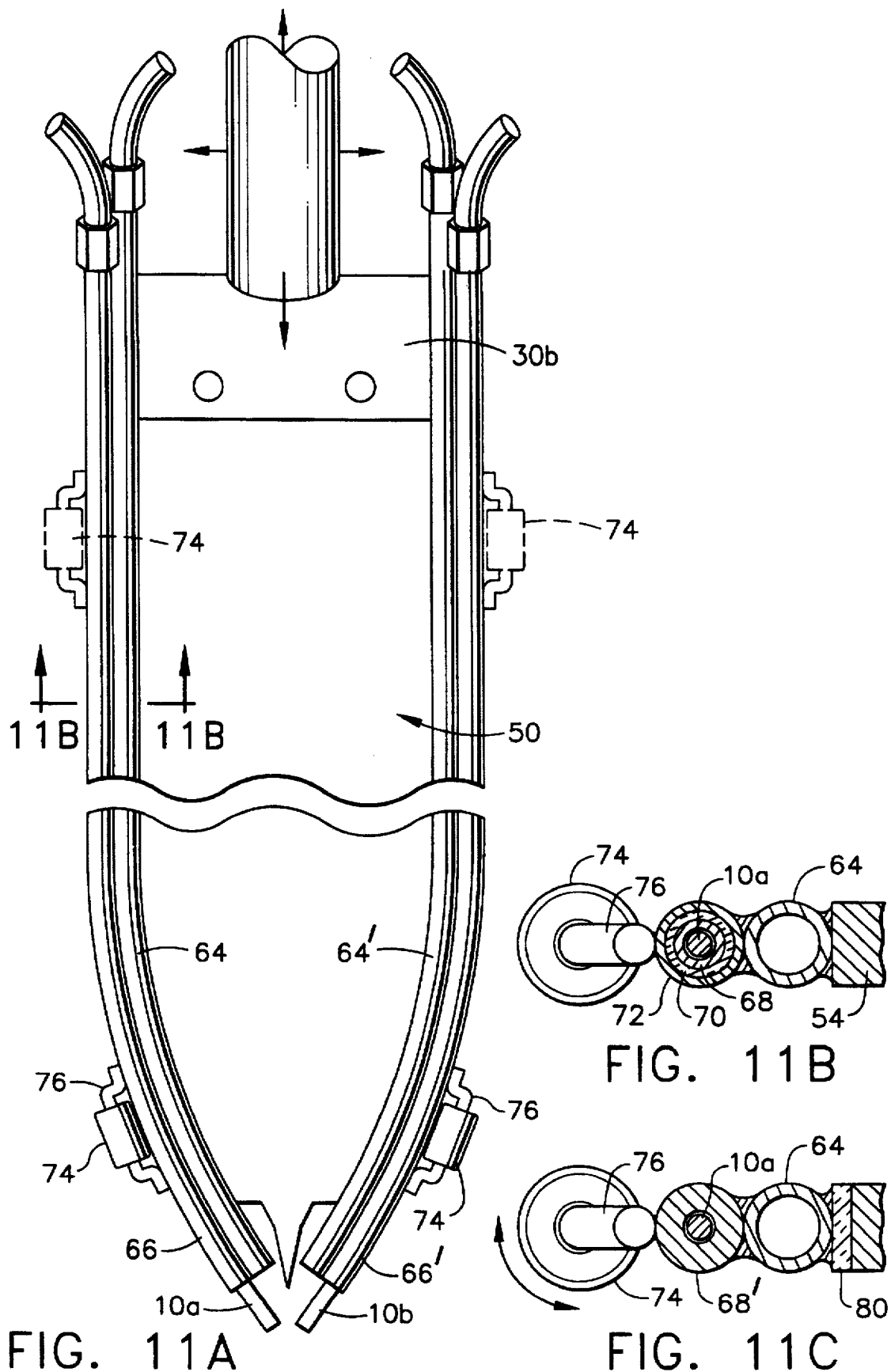

METHOD AND APPARATUS FOR JOINING COMPONENTS WITH MULTIPLE FILLER MATERIALS

FIELD OF THE INVENTION

This invention generally relates to methods and apparatus for joining components. In particular, the invention relates to automated welding in a groove of small width for joining metal components.

BACKGROUND OF THE INVENTION

Conventional mechanized and automatic welding (and to a lesser extent brazing) practice has focused on methods for improvement in the joint microstructural condition and residual stress level, especially for materials susceptible to stress-induced cracking such as stress corrosion cracking (SCC). In addition, emphasis has been placed on improving the joining productivity while maintaining or increasing the joint quality, especially for thicker section materials. One of these modifications, relative to conventional V-groove joints, has been to decrease the volume of the filler deposited by reducing the width of the weld joint. This technique is known in the art as "narrow groove" (or narrow gap) welding. As the joints are made thinner with steeper side wall angles, there are width and aspect ratio limitations on the joint design which can be reliably completed, even when using only a single filler material. As the technical and practical needs increase to make joints even thinner, the difficulty of locating and precisely controlling the feeding of multiple, nonparallel filler materials into these narrow and relatively deep joints using conventional equipment and procedures becomes even greater, or is impractical for many applications.

An additional problem for thin, high-aspect-ratio joints is the limitation in the filler deposition rate and corresponding joint completion rate, which are strongly controlled by the maximum practical filler melt-off rate that does not result in risk of lack of fusion or other defects. The practice of feeding only a single filler into the molten pool at any point in time during the deposition of a filler pass is inherently limited in its thermal efficiency for utilizing the most power of the heat source. The feeding of two fillers simultaneously, one of which is fed into the molten pool but intentionally not located in the hottest or most effective melting portion of the heat source, is also inherently limited in thermal efficiency. These practices result in undesirable limitations on the filler melt-off rate and productivity.

Commercial systems are available for feeding multiple filler wires. The general approach used in the welding industry for multiple filler material addition is to feed using two nozzles, each feeding at different times. The nozzles are aimed from different directions, typically from the leading and trailing sides of the torch (or other heat source), with respect to the direction of torch travel. One scheme is to feed from the two opposing, non-parallel nozzles alternately as the direction of torch travel is periodically changed from a forward to a reverse direction, such as to continue an orbital joining application while rewinding cables which have become wrapped around a component while traveling in the forward direction during the deposition of multiple fill passes. This commercially available system configuration is commonly called "dual wire feed" and allows a productivity improvement for some multipass, bidirectional travel applications.

Another known scheme is to feed from two opposing, non-parallel nozzles simultaneously while welding in either the forward, reverse or both directions, typically in an attempt to improve the filler deposition rate. One variation of this scheme is to try to align both filler nozzles, and therefore the aim points of both wires, to the desired part of the molten pool (under the heat source).

Another variation used with lateral torch and filler material oscillation is to synchronize the aim of one filler nozzle to the current position of the heat source, and to synchronize the other nozzle to be aimed into the portion of the molten pool from which the heat source has just moved in an effort to utilize some of the excess/residual heat remaining in the pool. In this latter configuration, the "chill" filler material feed rate typically is only a small fraction of the primary feed rate. This system is claimed to improve productivity by the use of the additional out-of phase trailing-side chill wire feed.

A number of welding systems are commercially available which allow pulsing of a single filler material between two feed rates synchronized with pulsing of the arc between two power levels. At higher pulse frequencies, however, the combination of mechanical slack in the drive mechanism (motor gearheads, etc.) and the clearance between the inside dimension of the filler conduit and the outside dimension of the filler material cause the individual feed rates to be smeared into an average value as the filler leaves the outlet end of the feed nozzle. Effectively, this averaging condition is aggravated by the mechanical inertia of the drive mechanisms, and results in inefficient use of the significantly greater filler material heating and melting capability of the higher power level. The heating and melting capability of an electric welding arc, for example, is proportional to the square of the current, so that high current levels are significantly more effective in melting filler material than lower current levels.

Conventional filler nozzles are stiff and, due to their large width, cannot be inserted into a very thin joint. The standard approach of increasing the filler stickout beyond the end of the nozzle in order to reach into a thin joint is limited by the lack of filler position control near the bottom of such joints if they are deep, as is the case in thicker materials. This lack of position control not only leads to filler melting inefficiencies as the aim to the hottest part of the arc is degraded, but also leads to electrode contamination, fusion defects, and process terminations when the filler material inadvertently contacts the (nonconsumable) electrode and disturbs the arc geometry and thermal properties.

Multiple filler material equipment designs utilizing individual nozzles for multiple feed applications use straight guide tubes which do not automatically compensate for the fact that the unsupported filler shape is not straight, and that the end does not follow a straight path after leaving the nozzle. This design has the disadvantage of providing no aiming control of the wire position after it leaves the outlet end of the nozzle, to compensate for the fact that the wire has a "cast" or helical configuration remaining from the permanent bending that occurs as it is wound on circular spools. The previously bent wire springs back into the curved configuration reflecting a portion of the bending strain it had when on the spool. This curvature is typically accounted for as the filler is initially positioned relative to the heat source (such as the tip of a non-consumable electrode), and in some cases can be manually overridden during the course of the joining with the use of multi-axis motorized filler nozzle positioners. This method relies on an operator for periodic aiming adjustments, and would be very tedious when more than one filler is fed at the same time, especially with high-speed joining practices.

SUMMARY OF THE INVENTION

The present invention is a method and an apparatus for feeding multiple filler materials into reduced width, high aspect-ratio (ratio of depth-to-width) weld or braze joints. The method and apparatus of the invention facilitate joining with improved control and stability of the filler material position as it enters the heat source and adjacent molten pool area. The method and apparatus also provide higher filler melting thermal efficiency and corresponding deposition (melt-off) rates, resulting in joint material properties and joining productivity benefits significantly above conventional, more complex practices. These improvements are best realized when a multiple filler material method is used with a multiple filler nozzle apparatus.

The use of a nozzle capable of feeding multiple, generally parallel filler materials can significantly improve joining productivity while simultaneously keeping the heat input at a minimum, which is a key feature of the new configuration. The distinction between the existing industrial practice of dual wire feed and the method disclosed here is that the standard dual wire feed occurs alternately from different nozzles as the torch travels forward and reverse or oscillates laterally across the joint, whereas in this new method multiple, substantially parallel filler materials, such as in the form of wires, are fed from the same nozzle simultaneously in either the leading or the trailing directions (or in both directions). The main technical features which provide for more efficient heat transfer to and through the filler material from an external heat source, such as an arc or a power beam, are the following:

1. The surface convection area for heat transfer into a given length of multiple wires, as compared to the area of a single wire having the same length and volume (but correspondingly greater thickness) is significantly increased.

2. The thickness for a non-circular shape (or shorter radius and diameter for a circular shape) of the smaller wire which the externally-supplied heat must be conducted through, before the wire is fully melted to its center and then across its full diameter, is significantly reduced.

3. The time this multiple filler material surface area is exposed to the heat source is significantly increased and is proportionally greater than that of a single smaller wire fed at a faster linear rate.

4. The position of multiple filler materials as they near the weld or braze pool may be favorably selected with respect to the preferred position in the temperature distribution across the heat source, allowing better heat transfer and therefore higher thermal efficiency for the joining process. The predetermined outlet angle and spacing between the nozzle holes determines the filler convergence position.

5. The multiple filler materials can be located in closer proximity to each other, allowing better mixing and chemical homogeneity of the deposit when wires of different compositions are melted to yield a composite or tailored alloy.

6. The redundancy of the multiple filler materials allows variations in the feed rate of one or more of the filters to be accommodated with less disturbance of the melting process, since each filler represents only a fraction of the total melt-off rate.

7. The spacing of the end of the filler material relative to the non-consumable electrode, if present, is significantly improved due to the inherently greater stiffness of the disclosed design of multiple filler nozzle. One variation of the nozzle design is with the electrode made as a mechanically integral part of the nozzle assembly, which provides an accurate and constant aim for the filler material relative to the heat source.

8. The aiming consistency for each of the multiple fillers can be controlled even with substantial amounts of "cast" in the filler shape (after being unwound from a spool) due to the self-aligning optional feature of nozzle holes having a curved shape, forcing the curved-shape filler to consistently follow the predetermined orientation of the curved shape of the nozzle. Each of the foregoing effects (¶¶1–8) allows the minimum required power of the weld or braze heating source to be reduced when using the multiple finer wires, and in turn improves the thermal efficiency of the weld or braze joint. Together, they provide an even greater improvement in melting thermal efficiency. The thermal efficiency is improved since with lower power input to fill a joint having a fixed volume, less power is wasted in melting excess base material. In addition, less thermal damage occurs in the components joined (such as local shrinkage, overall distortion, and micro-structural damage in the heat-affected zone).

9. The feed rates of the multiple wires may optionally be individually pulse-synchronized with the periodic pulsing of the arc power, if used. This feature allows more thermally efficient melting of multiple fillers having different melting points, with the higher-melting-temperature fillers fed at a proportionally greater rate during the high-power portion of the cycle, and the lower-melting-temperature fillers fed at a greater rate during the low-power pulse.

Additional technical benefits which are not directly related to the thermal efficiency of the invention include the following:

1. The multiple nozzles can be used to compensate for weld dilution effects by alloying to generate more favorable uniform, gradient or stepped compositions in joints or cladding. These various composition configurations can be achieved by feeding variable rates of two or more different alloys into the joint. This benefit is preferred, for example, at the free surfaces exposed to process fluids or at the parent metal interfaces when they are of a different composition than the filler material.

2. The multiple nozzles can also be used to deliver additives to the weld pool, such as powders for alloying effects including in-situ alloying with noble metal catalytic elements (e.g. palladium) or enrichment with SCC-resistant elements (e.g., chromium). As used herein, the term "noble metal" means a metal from the group consisting of platinum, palladium, osmium, ruthenium, iridium, rhodium, and mixtures of elements from that group. Additives may also be introduced which do not alloy with the weld material, but form a composite structure instead. The invention can also be used to deposit claddings having custom-alloyed compositions using the in-situ alloying method and standard-alloy filler materials.

3. In addition, the multiple nozzles can be used for local delivery of at least one of the filler materials which contains weld fluxing surfactants and/or weld penetration agents to enhance the performance of the other fillers, which may be made of standard composition alloys, or to raise the weldability of difficult "high purity" alloys, providing them with acceptable weldability.

4. Multiple nozzles can be used to produce functionally gradient material (FGM) joints by welding or brazing, with the advantage that the slope of the gradient composition through the depth of the joint (typically the thickness of the material) may be better adjusted to suit an application. As an example, the gradient may be more uniform or have a reduced slope as required to realize the benefits in properties of a gradient joint. One configuration of the nozzles which can produce this result is a vertical arrangement of the individual nozzles in the assembly.

5. The use of multiple nozzles can improve the total filler melt-off rate by using individually tailored feed speeds, with each adjusted to a maximum value according to its precise position in the temperature gradient of the arc (or other heat source). With one or more fillers positioned in the hottest part of the arc and fed at a higher rate than the remaining fillers positioned at a cooler portion of the arc and fed at a correspondingly slower (but individually maximized) rate, the maximum total feed rate can then be set higher than if only one larger diameter, more difficult to melt filler were used.

Other commercial or practical advantages of the disclosed invention include the following:

1. Feeding multiple fine (but metallurgically hard and stiff) diameter wires at a slower lineal feed rate, rather than feeding an even finer single wire at a faster lineal rate (corresponding to the same volumetric feed rate), is advantageous in that the very fine wire is more prone to buckle and collapse in axial compression than the thicker wires as they are pushed through the typically circuitous conduit system to the guide nozzle. For a constant filler material volumetric feed rate and a constant linear feed velocity, a change from a quantity of one larger cylindrical filler to an arbitrary quantity of N smaller, equal-radius cylindrical fillers is governed by the relationship:

$$R_1 = \sqrt{NR_N^2}$$

where $R_1$ is the radius of the larger single filler and $R_N$ is the radius of each of the smaller multiple fillers. Therefore, the increase in the surface area of N multiple fillers is $N^{1/2}$ times greater than for a single filler fed at an equal feed rate.

2. Another practical benefit of multiple wires fed from a single, multi-port nozzle rather than several multiple nozzles is that the stability of their aim point(s) can be maintained more accurately. This benefit exists for either monolithic or fabricated nozzle designs.

3. A commercial advantage of using multiple fine wires rather than an even finer single wire, which would be fed at proportionately higher linear speed, is that the very fine wires cost more per unit volume (or weight) to fabricate.

In addition to the filler melt-off rate, another significant limiting factor in welding productivity is typically the maximum size of the weld pool that can be maintained in a stable manner while balancing the competing forces of gravity and surface tension. Use of thermally efficient multiple filler wires of smaller size fed directly under the arc, as allowed by the flat wire-feed multiple nozzle configuration, provides a higher filler deposition rate as compared to the out-of-phase trailing-side chill wire feed or the single-wire feed prior art methods). This effect is possible since the volume of base material which is correspondingly melted with this practice is reduced, and in turn keeps the total volume of metal melted at any point in time within practical limits. The use of multiple wires fed at slower linear speed, rather than one wire fed at higher speed with a volumetrically equivalent feed rate, also permits inertia allowances for the wire spool drive during starts and stops to be relaxed. This consideration is important when feeding at very high speeds, or from massive wire spools, or both.

Thus, the invention allows a practical balance to be achieved between the higher thermal efficiency and melt-off rate of very fine filler material having poor handling characteristics, and the poor thermal efficiency and melt-off rate of coarser filler material having more forgiving handling characteristics.

The method and apparatus of the invention are suitable for improving many known automatic and mechanized arc and power beam welding or brazing practices, and can be applied for deposition of wire which is either a combined consumable electrode and filler metal, or only a filler metal. The benefits of the invention apply to joining of non-metallic materials as well as metallic ones or combinations thereof, although the primary application may be for all-metallic joints.

Other technical advantages include the option for multi-functional capabilities to improve the thermal efficiency and other characteristics of the welding or brazing process and the completed joint by utilizing variations such as simultaneously feeding multiple wires of the same or different alloys, and electrically preheating one or more of the filler wires.

A practical advantage of the invention is that it permits improved direct visual or remote camera viewing of the internal portion of the joint, without significant obstruction of the view by the wire feed guide nozzle. In accordance with the invention, any obstruction of the view is limited to only one side of the weld or braze pool, as compared to the known art of feeding simultaneously from several different sides. During joining with reduced-width grooves using the prior art, multiple materials are fed from both the leading and trailing sides of the joint, resulting in significant obstruction of the potential field of view for the current and prior joining passes. Also, the invention provides a better view of the weld passes due to the thin width of the nozzle, even for single-sided filler feeding equipment.

In summary, welding and brazing productivity advantages include the capability to increase the filler metal deposition rate by increasing the filler material feed rate without increasing the specific heat input (or alternately decreasing the heat input for a fixed filler feed rate), reduce the number of fill passes required, and therefore decrease the total welding or brazing time and cost. Additional productivity advantages include incorporation of features which would otherwise lead to more risk of weld or braze defects, such as joining at higher travel speeds or with alloys having a lower wetting ability, while maintaining a fixed filler deposition rate and specific heat input. In brief, the technical benefits for the combined use of the multiple filler material method and apparatus include the following: (1) higher filler material melting thermal efficiency; (2) greater filler material melt-off (deposition) rates; (3) capability for in-situ alloying and doping; (4) decreased heat input for predetermined fill rates; and (5) improved synchronization of filler and power pulsing. The practical benefits include: (1) improved position control of the filler material; (2) reduced obstruction of the molten pool view; (3) integration of complementary joining functions; (4) increased tolerance against various joint defects; (5) simplified filler material equipment and controls; and (6) higher joint overall production (fill) rates.

BRIEF DESCRIPTION OF THE DRAWINGS

FIG. 9 is a schematic showing an isometric view of a curved multiple-filler-material nozzle assembly having a filler cast control and convergent aim design in accordance with an eighth preferred embodiment of the invention.

FIG. 9A is a detailed view of the distal ends of three filler wires being guided by the curved multiple-filler-material nozzle assembly of FIG. 9 into the welding arc.

FIG. 10A is a front view of a composite filler nozzle and non-consumable electrode in accordance with a ninth preferred embodiment of the invention.

FIG. 10B is a sectional view taken along line 10B—10B shown in FIG. 10A.

FIG. 10C is a front view of a ceramic ball insulator/guide loosely retained in a crimped retainer sleeve.

FIG. 11A is a schematic showing a front view of a multiple-filler-material nozzle assembly having a double convex edge with edge roller standoffs, in accordance with yet another preferred embodiment of the invention.

FIGS. 11B and 11C are detailed plan views of further variations of the composite structure depicted in FIG. 11A in which the filler wire is preheated.

DETAILED DESCRIPTION OF THE PREFERRED EMBODIMENTS

Figure 1A:
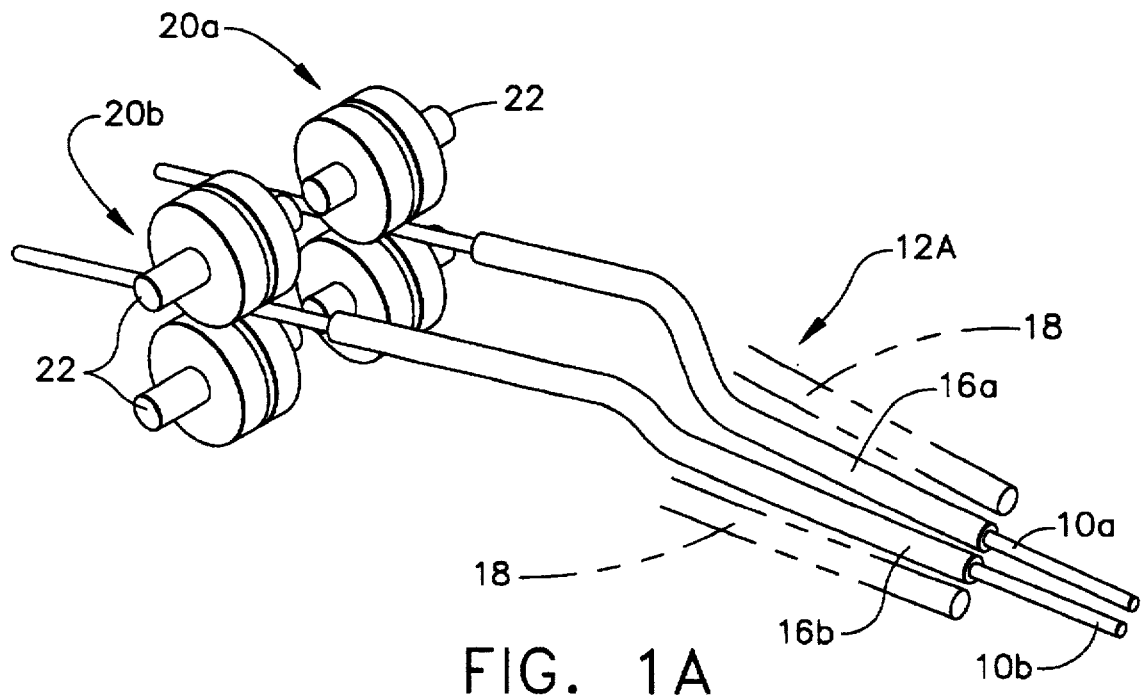
FIG. 1A is a schematic showing an isometric view of a multiple-parallel-wire feeder/mixer in accordance with a first preferred embodiment of the invention.

In accordance with a preferred embodiment of the invention shown in FIG. 1A, first and second wires 10a, 10b may be fed into the same multi-port nozzle guide assembly 12A by driving them with a stacked set of respective single-groove drive roll pairs 20a, 20b rotatably mounted on mutually parallel shafts 22. Alternatively, the multiple filler wires may be fed with a single pair of drive rolls (not shown) having multiple grooves. Although only two wires are shown in FIG. 1A, the present invention encompasses the concept of feeding two or more wires through a single multi-port nozzle guide assembly. To vary the relative speed of only some of the multiple wires, they may be fed with additional independently driven or synchronously driven and controlled sets of rolls as required.

The multi-port nozzle assembly can be fabricated from pieces of small circular or non-circular tubing 16a and 16b, at least the tips of which are joined to a pair of high-strength rod or bar stock stiffeners 18 (see FIG. 1A) arranged on opposing sides thereof. In the alternative, only one stiffener can be used. Filler wires 10a and 10b are respectively fed through tubing 16a and 16b, with the nozzle assembly 12A being positioned such that the ends of the filler wires 10a and 10b are located at the site of the weld bead to be formed.

The tubing 16a and 16b (hereinafter "filler guide nozzle") can be made of tungsten (such as is produced by the chemical vapor deposition technique), or of other high-strength, wear-resistant material, such as metal carbide. The stiffeners 18, as well as the filler guide nozzles 16, can be made from carbide, tungsten, etc., in order to produce the stiffest, most heat- and wear-resistant nozzle assembly practical, or of high-strength tempered steel to produce the toughest (fracture resistant) assembly.

Figure 1B:
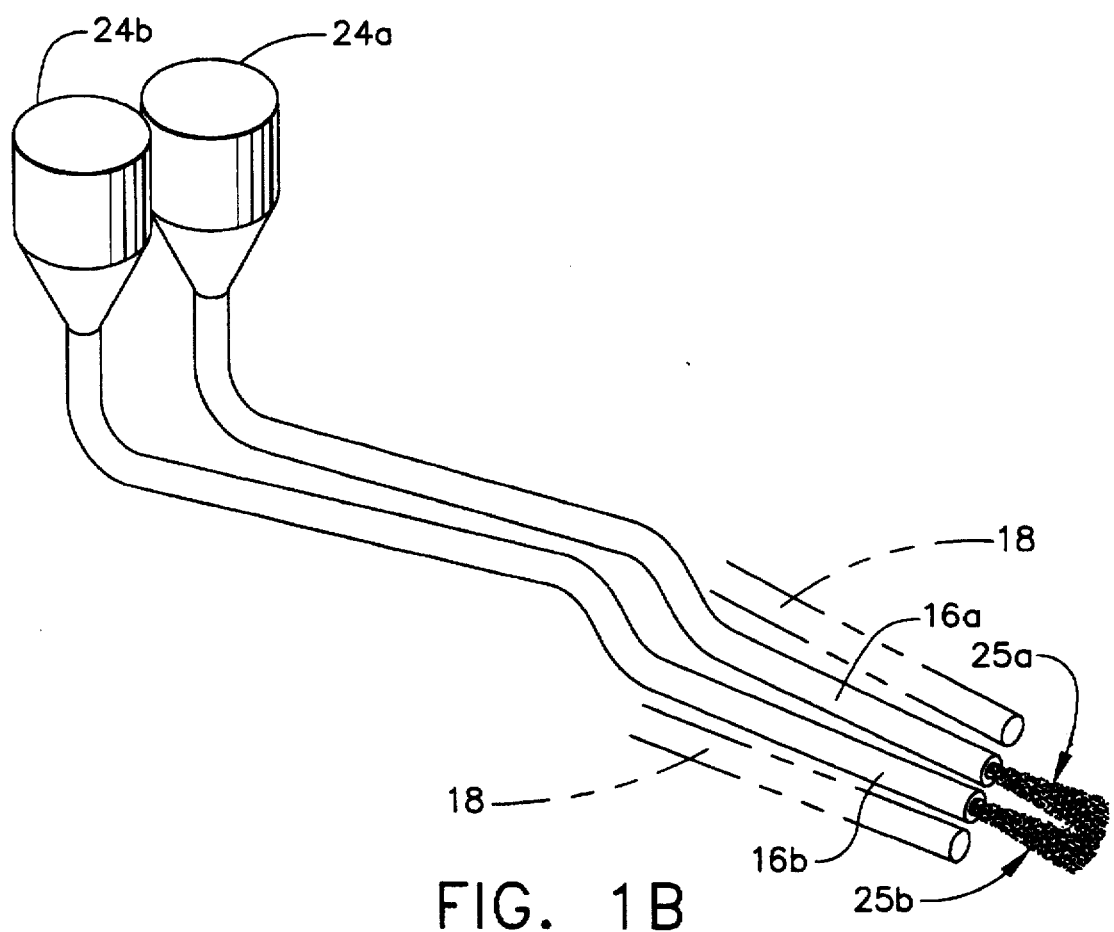
FIG. 1B is a schematic showing an isometric view of a multiple-parallel-powder feeder/mixer in accordance with a second preferred embodiment of the invention.

Alternatively, hoppers 24a and 24b can be used to feed respective particulate fillers 25a and 25b into tubing 16a and 16b of the multi-port nozzle assembly shown in FIG. 1B. Other mechanical mechanisms may be used as desired to feed the multi-port nozzle assembly with either continuous solid materials, particulate fillers, gas-fluidized powders or separate gasses.

Figure 2:
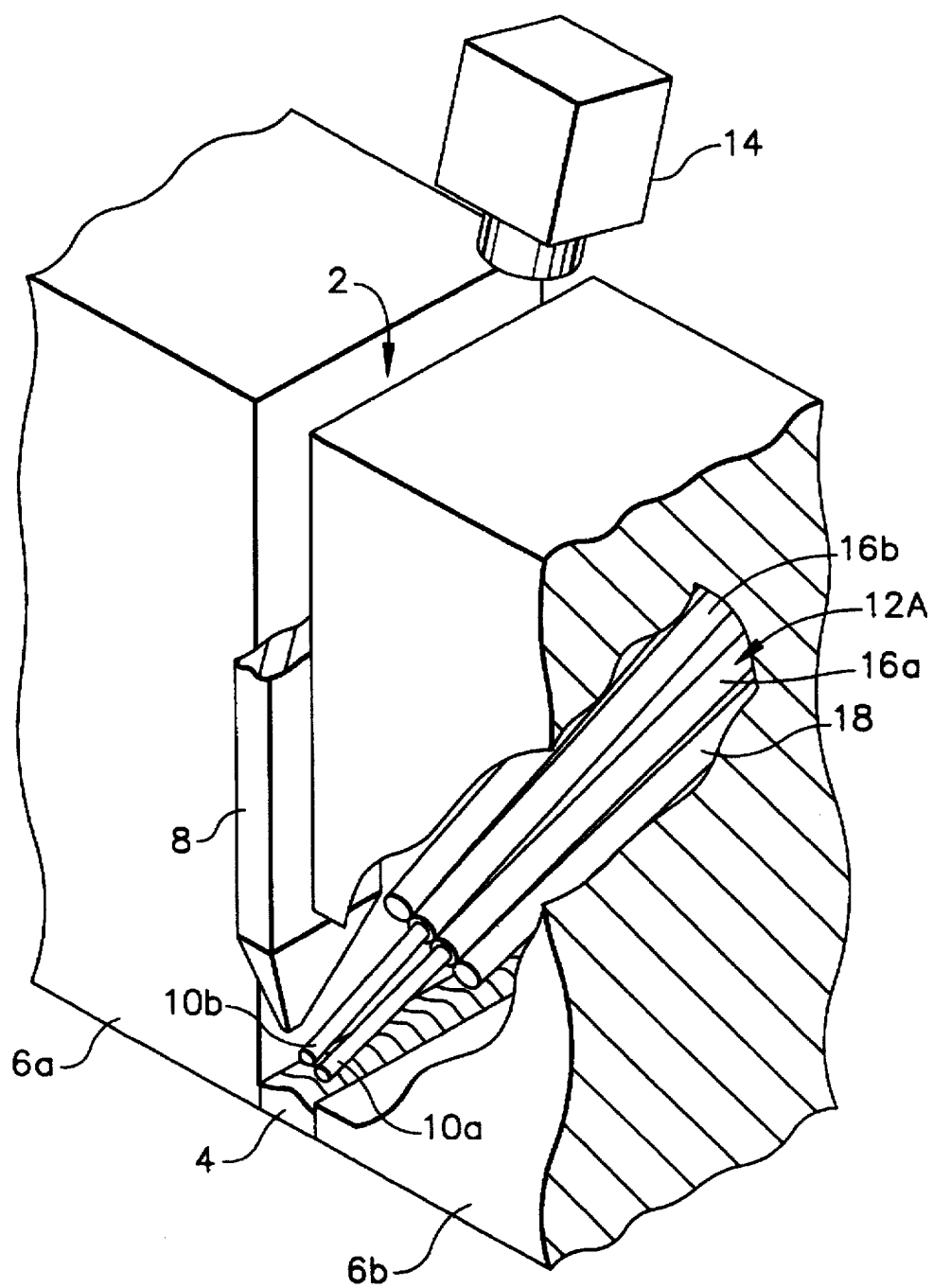
FIG. 2 is a schematic showing an isometric view of a multiple-filler-material nozzle assembly with cylindrical stiffeners in accordance with the first preferred embodiment.

The multiple filler metal tubes can be joined essentially parallel to each other along their length, or alternately at a small angle to each other, so that the filler material exiting the nozzles is traveling in directions that converge near or at the focus (highest energy density/temperature portion) of the heat source for more thermally efficient and faster capability melting. An example of this configuration is shown schematically in FIG. 2 for a very-reduced-width, high-aspect-ratio arc welding joint utilizing a flat electrode configuration. In particular, the filler material nozzle assembly of the present invention can be used as part of a gas tungsten arc welding (GTAW) system adapted for welding a reduced-width groove 2 to form a welded joint 4 between parts 6a and 6b. The GTAW system has mechanized torch movement and a tungsten electrode 8 with a geometry designed to fit in the reduced-width groove 2. The sidewalls of groove 2 preferably have an acute angle less than 5°. The blade of electrode 8 has a non-circular cross section. In particular, the blade cross section has an elongated dimension which is oriented parallel to the length of the weld joint and a shortened dimension which is oriented perpendicular to the length of the joint, e.g., a cylinder having a generally rectangular cross section.

The weld beads 4 are deposited inside the groove 2 using the thin elongated tungsten alloy electrode 8 to melt the filler wires 10a and 10b fed into the groove by a filler material nozzle assembly 12A. Electrode 8 fits inside groove 2 with clearance between the electrode and the sidewalls. The blade of electrode 8 is optionally covered with a ceramic coating to prevent arcing to the sidewalls of groove 2. The welding electrode 8 is powered by a conventional arc power supply (not shown) to produce a primary arc. The flat electrode 8 and flat filler material nozzle assembly 12A, in conjunction with the small bevel angle and selected welding parameters, produce a very thin weld joint. During welding, the arc is preferably observed using at least one remote viewing camera 14.

In accordance with the preferred embodiments of the invention, the filler material nozzle apparatus (e.g., 12A in FIG. 2) has a non-circular cross section. In particular, the cross-sectional shape of the filler material guide nozzle assembly is designed to be thin in a direction perpendicular to the depth and length of the weld seam, and wide in a direction parallel to the seam. Also, the height and/or width may be tapered along the length of the nozzle assembly in order to provide as much stiffness as possible toward the inlet (mounted) end, and to be as narrow and thin as possible toward the outlet end. Alternatively, non-circular cross-section filler wire or strip may be used to increase the surface area and therefore improve the heat transfer area and melting efficiency.

The reasons for using a non-circular (e.g., blade-shaped) nozzle apparatus include the following: A) to provide a lateral stiffness to the nozzle sufficient to maintain adequate filler metal position guidance, while providing only the minimum practical width (in a direction perpendicular to the walls) when used in joints of reduced width which would otherwise be too narrow to be filled; B) to provide increased nozzle flexural strength both parallel and perpendicular to the joint depth so that the desired filler metal guidance is maintained, despite inadvertent physical handling or abusive nozzle mechanized steering; C) to provide a minimum nozzle width (in a direction perpendicular to the weld seam) so that the view in the joint from a remote weld-viewing camera is not obstructed by the portion of the nozzle passing through the view; D) to provide sufficient nozzle height (in a direction parallel to the joint depth) to allow multiple joining-related functions to be implemented simultaneously, or specific single functions to be implemented more efficiently and productively with the same nozzle assembly as used for the joining process; and E) to allow the nozzle to extend close to the bottom of a very reduced-width joint for powder feed additions directly into the filler metal molten pool. Fluidized powder, if fed from a larger nozzle not within the joint, would diverge excessively within the joint and result in a significant loss of filler material deposition efficiency into the pool.

Figure 3A:
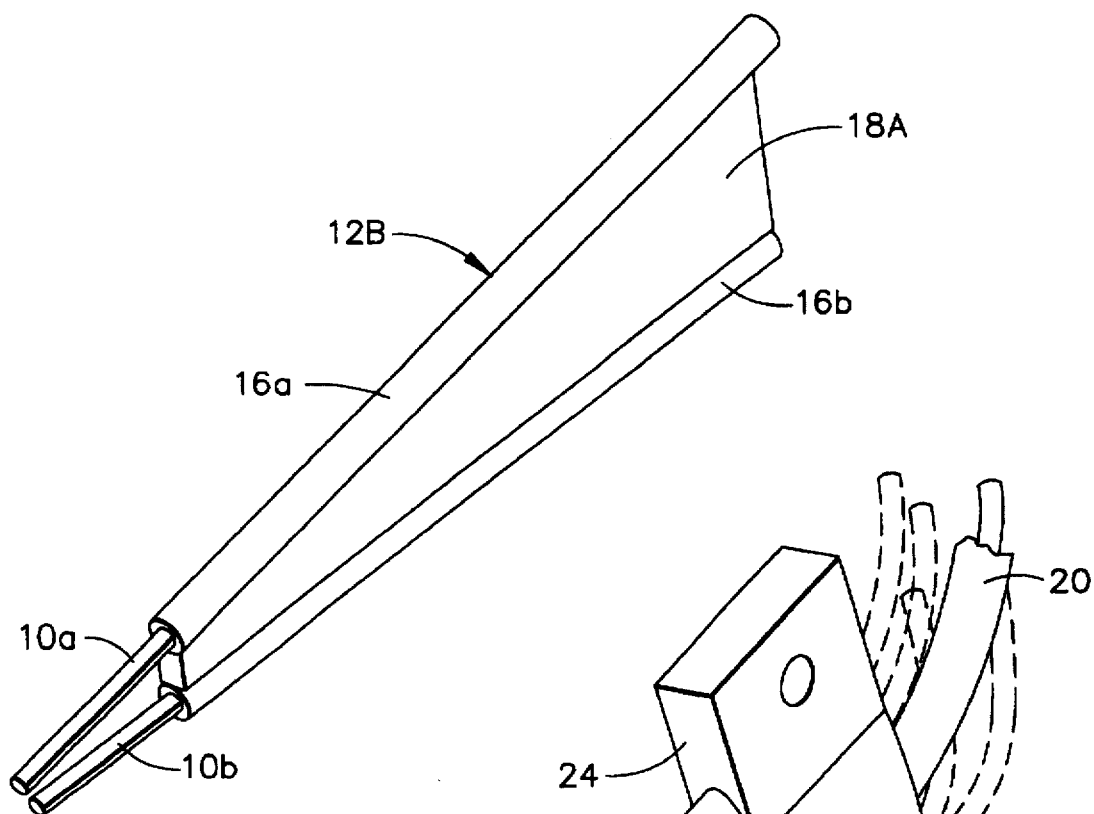
FIG. 3A is a schematic showing an isometric view of a multiple-filler-material nozzle assembly having a segmented design with convergent spacer and stiffener in accordance with a third preferred embodiment.

The multiple tubes can also be joined to a thin, tapered stiffener along their length and at a small angle to each other, with the stiffener piece preferably made of high-yield-strength material (such as tungsten alloy or stainless steel cut into a long, thin shape) so that the filler material converges to a near point at a predetermined location. An efficient shape of such a convergent spacer and stiffener is a truncated triangular plate 18A having a base dimension less than that of its adjacent sides, as shown in the nozzle assembly 12B of FIG. 3A. Similar shapes with curved sides are discussed below. Additional nozzles can be attached to tube 16a or tube 16b or both to form a nozzle stack in the plane of the stiffener plate.

One configuration of stiffener is a long thin triangular piece of tungsten alloy sheet stock (or other high-yield-strength material such as carbide) which is brazed, welded, mechanically fastened, or otherwise joined to the filler nozzle tube with the narrow vertex of the triangle at the outlet end of the tube. This configuration provides the greatest resistance against bending when the nozzle assembly is mounted on a mounting bracket (not shown) as a cantilever at the wide end of the triangle. The mounting bracket is connected to a drive apparatus (not shown) for raising and lowering the filler material nozzle assembly.

Figure 3B:
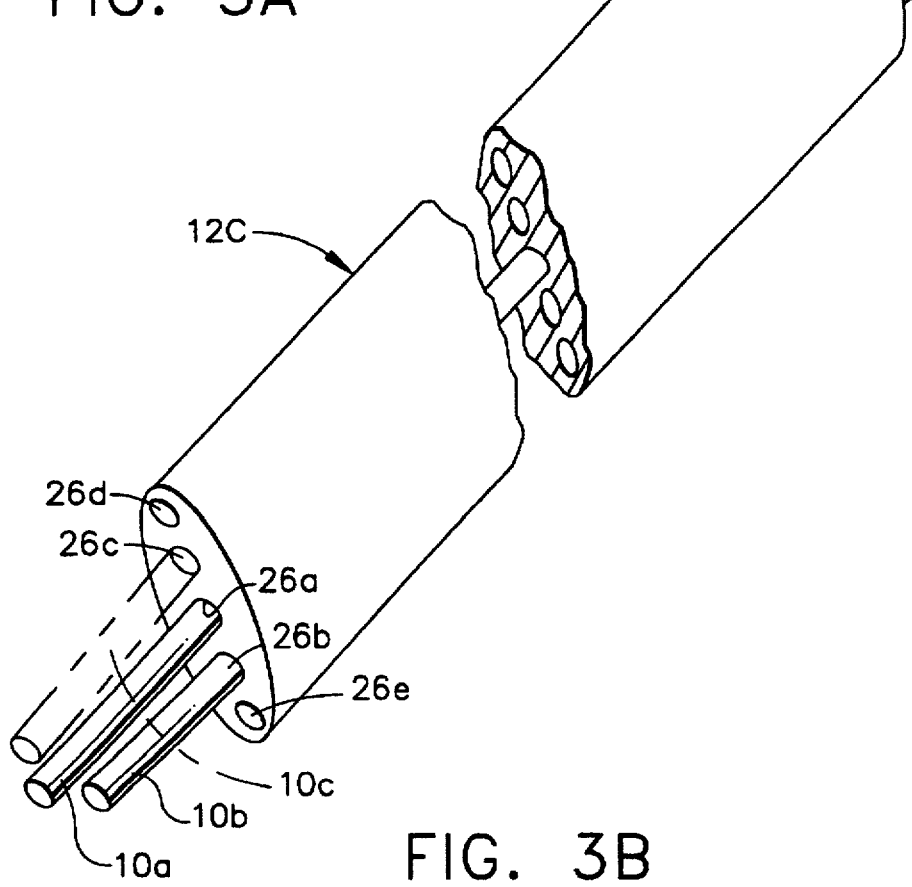
FIG. 3B is a schematic showing an isometric view of a multiple-filler-material nozzle assembly having a monolithic design with convergent filler guide nozzles in accordance with a fourth preferred embodiment.

FIG. 3B shows a monolithic filler nozzle 12C having an oval shape with two (26a, 26b) or more (26c) port holes for filler materials (10a, 10b, 10c), and with the option of additional ports 26d and 26e to feed process-required gases, illuminating, heating, or sensing/control laser light beams, electrical conductors, etc. The guide nozzle, which is supported by a mounting bracket 24, guides the filler material from points outside the weld groove to a desired location inside the weld groove, namely, in proximity to the weld puddle. The filler material is guided into the nozzle by way of a respective conduit 20. Alternatively, the cross section of the monolithic assembly can be a rectangle instead of an oval.

The ports 26a–26c can also be used to deliver solid additives to the weld pool, such as powders for alloying effects, including in-situ alloying with noble metal catalytic elements (e.g., palladium), enrichment with SCC-resistant elements (e.g., chromium), or fluxes and surfactants to improve weld penetration and/or wetting. Additives may also be introduced which do not alloy with the weld material, but rather form a composite structure.

The optional ports 26d and 26e of the monolithic nozzle 12C can also be used to deliver the main source or an auxiliary melting heat source for the joining process, such as laser light passing through fiber optics in the nozzles. This variation can be especially useful for work in very reduced-width joints with laser systems having higher beam quality, which allow sufficiently focused heat to be fiber-optically delivered to the weld pool without the need for space-taking objective lenses at the end of the fiber.

Figure 4:
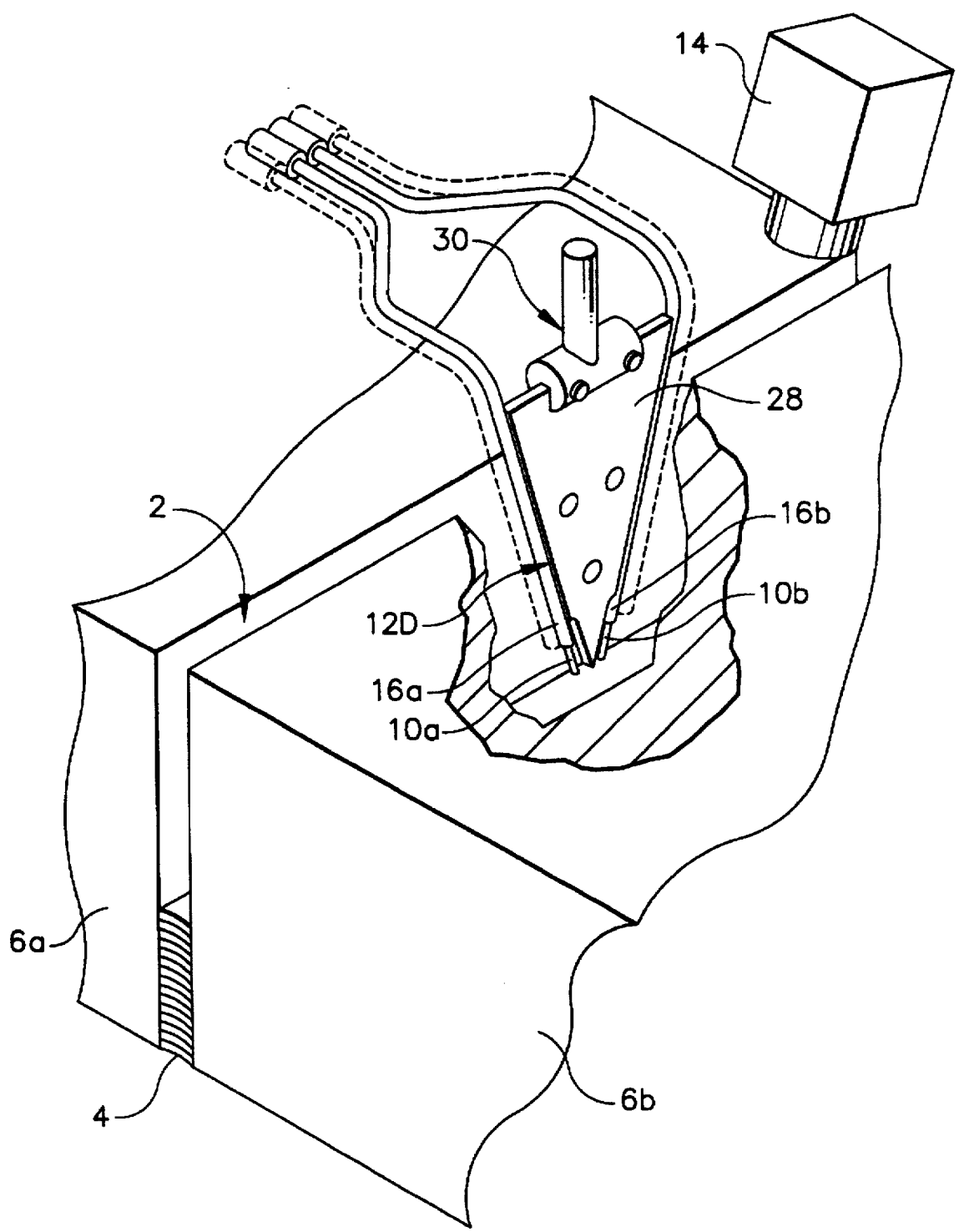
FIG. 4 is a schematic showing an isometric view of a multiple-filler-material nozzle assembly carried by a non-consumable electrode in accordance with a fifth preferred embodiment of the invention.
Figure 5A:
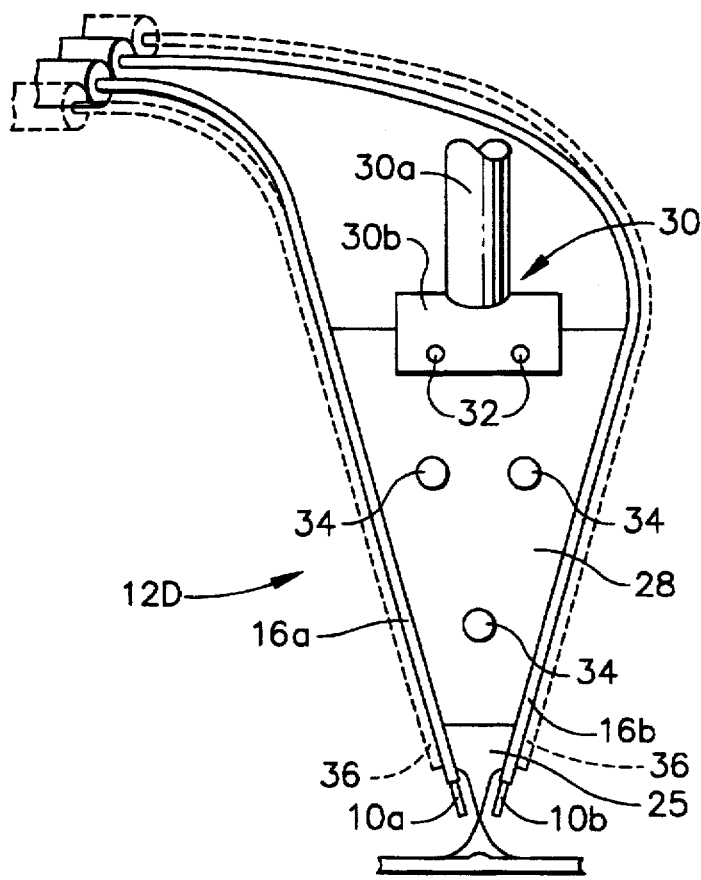
FIG. 5A is a schematic showing a front view of the multiple-filler-material nozzle assembly of FIG. 4.
Figure 5B:
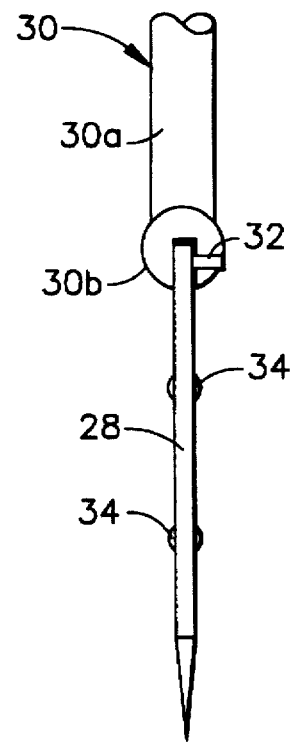
FIG. 5B is a schematic showing a side view of the non-consumable electrode incorporated in the composite structure depicted in FIG. 5A.

A significantly different variation of the multiple filler material nozzle in accordance with the invention is to mount the filler nozzles on the straight or curved edges of a wider base triangle of mechanically strong, heat-resisting, electrically conductive thin material, e.g., the flat electrode 28, to form the filler material guide nozzle assembly 12D seen in FIGS. 4, 5A and 5B. The flat electrode 28 provides the functions of a monolithic stiffener for the filler material nozzles 16a and 16b and a non-consumable electrode. Alternatively, the triangular plate of the nozzle assembly serves as a combination stiffener for the nozzles and holder for a non-consumable electrode tip (not shown in the drawings). The preferred combination design has a tip which is electrically and mechanically connected to the stiffener, yet which is removable. The filler feed tubes at the edges must be electrically insulated from the electrode tip and body.

The wider base triangular variation has the advantage of providing relative position stability between the electrode tip and the melting end of the continuous filler materials, or streams of filler if fed as a gas-fluidized product. Other port holes may be utilized as desired for process-required or supporting purposes, such as providing shielding or plasma-forming gases, or laser light beams for illumination, heating, tracking, etc. Straight edges are shown in FIG. 4, however, the advantages of curved edges similar to those shown in FIG. 10A apply to this wide-base triangular shape.

Figure 5C:
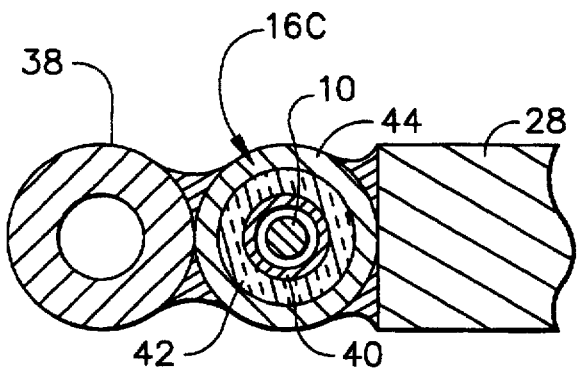
FIG. 5C is a detailed plan view of a further variation of the composite structure depicted in FIG. 5A in which the filler wire is preheated.

FIGS. 5A–5C show the details of the embodiment depicted in FIG. 4. A non-circular nozzle assembly can be made with a triangular (or rod-shaped) stiffener 28 fabricated from tungsten or other suitable high-temperature alloy, which functions both as a non-consumable welding electrode and as a nozzle stiffener. A triangular-shaped electrode/stiffener made from tungsten alloy sheet stock can provide sufficient cross-sectional area at its base (wide) end so that it can successfully resist unacceptable bending, as well as carry exceptionally high arc current despite its minimum thickness. The base of the triangle is clamped or otherwise held by an electrode holder 30. Electrode holder 30 is preferably made of a conductive, oxidation-resistant material such as copper alloy (e.g., beryllium-copper alloy), optionally electroplated with silver or nickel. The electrode holder preferably takes the form of a T-shaped metal body, comprising a shank 30a and a crosspiece 30b. The shank 30a is connected to a conventional welding torch (not shown). Crosspiece 30b has a longitudinal slot shaped for receiving the triangular blade base with sufficient play to allow easy insertion and removal. The blade base is held securely in the crosspiece slot by tightening a pair of set screws 32 in a corresponding pair of threaded holes formed in the crosspiece. The blade can be readily removed from the holder after the screws have been loosened. This allows easy replacement of a damaged electrode/stiffener blade. Alternatively, instead of using screws, the blade could be secured in the holder by brazing to create a monolithic blade assembly, i.e., the blade would not be readily replaceable. The blade body 28 is preferably covered with an insulating coating, e.g., $Al_2O_3$ or $Y_2O_3$, to prevent arcing to the welding groove sidewalls. Also, all rough edges on the stamped or cut blade are deburred to prevent arcing. In accordance with this preferred embodiment, the flat triangular blade incorporates one or more insulating standoffs 34. Each standoff 34 consists of a slug of insulating material, e.g., $Al_2O_3$ or $Y_2O_3$, having a cylindrical peripheral wall and a pair of slightly convex opposing surfaces or radiused edges at each end of the cylinder. As best seen in FIG. 5B, each insulating standoff 34 protrudes on both flat sides of the electrode blade 28 beyond the plane of the blade surface. These standoffs serve to maintain a minimum gap between the sidewalls of the welding groove and the flat sides of the electrode/stiffener blade, thus preventing scratching or excessive wear of the ceramic coating during electrode travel in the welding groove. A sufficiently deep scratch on the coated surface of the blade will remove the ceramic coating, leaving the blade susceptible to arcing along the uncoated locus.

If one of the filler guide nozzles 16a or 16b are electrically common with the stiffener 28, then the filler wire becomes the consumable electrode, as in metal inert gas (MIG) welding. In this case, the replaceable tip 25 (see FIG. 5A) can be removed. Alternatively, if the nozzles 16a and 16b are electrically insulated from the stiffener 28, then the stiffener is also a non-consumable electrode, as in tungsten inert gas (TIG) welding. Optional auxiliary nozzles 36, e.g., for carrying inert shielding gas, are shown by dashed lines in FIG. 5A. The shielding gas nozzles reduce the tendency for contamination—as would occur if shielding gas were blown into a deep narrow-width groove from outside the groove—by providing shielding gas in pure form locally where needed, i.e., covering the weld puddle.

In accordance with another variation shown in FIG. 5C, a filler guide nozzle 16c is welded to the stiffener 28 and a nozzle 38 for receiving temperature sensing means (not shown) is welded to the filler guide nozzle 16c. For the case where the filler wire is both a consumable electrode and a filler material, such as in MIG welding and flux cored arc welding, the nozzle is designed to conduct electrically to the filler wire in order to establish and maintain an arc from the melting end of the wire to the work. In this variation the nozzle is electrically insulated from the remainder of the welding torch. The filler guide nozzle 16c in this case comprises an electrical conductor 40 surrounded by an electrical insulator 42, which is in turn surrounded by structural tubing 44.

The stiffener(s) may be joined to and made electrically common with the filler guide nozzle apparatus by high-temperature brazing, precision welding (e.g. laser, electron beam, electrical resistance), or other means without risk of overheating and melting the joint(s) of the assembly during use.

Figure 6:
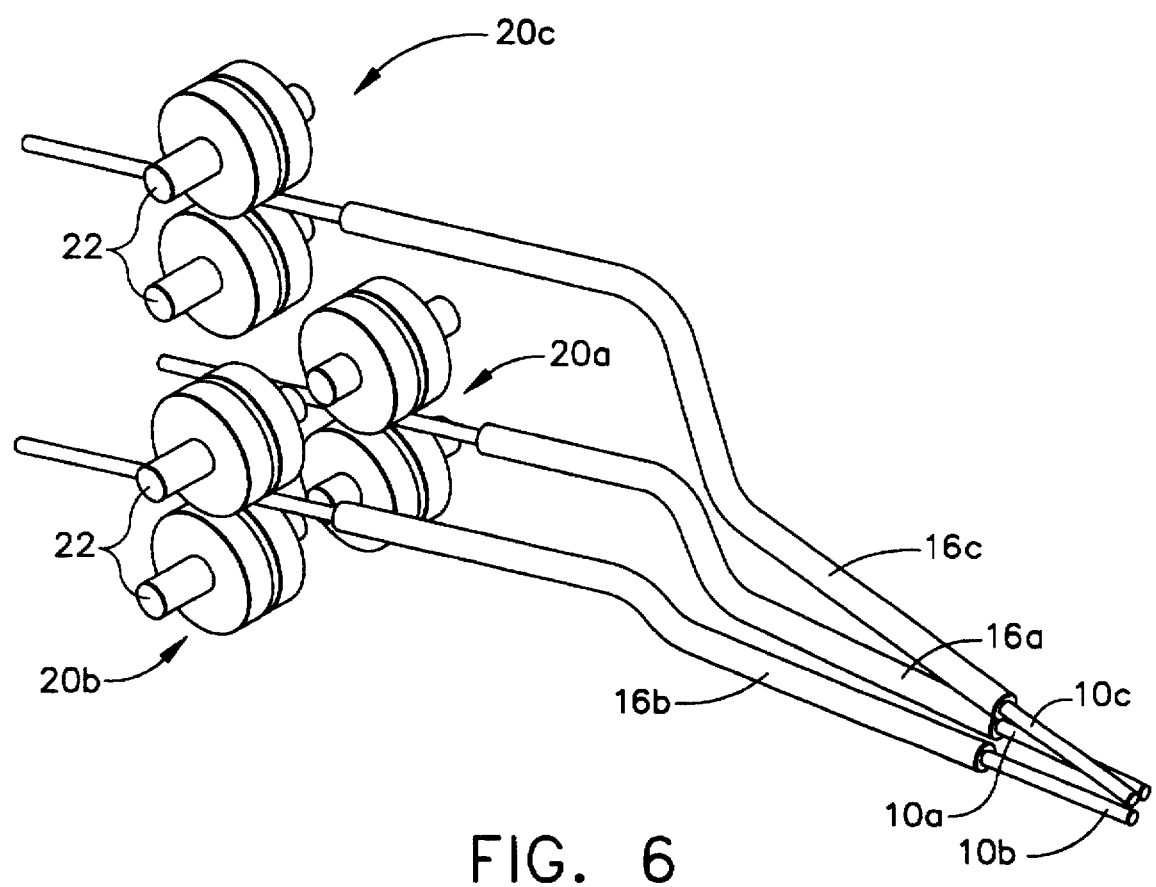
FIG. 6 is a schematic showing an isometric view of a three-parallel-wire feeder/mixer in accordance with a sixth preferred embodiment.

A variation of the nozzle outlet hole pattern which allows increased utilization of the nonlinear temperature distribution across the heat source is a pattern having two or more different filler materials and/or sizes. This thermally-biased pattern may be configured with a larger size/higher melting temperature filler approximately centered on the hottest portion of the heat source, and with a smaller size/lower melting temperature filler positioned below or to each side of the larger one and therefore located in the cooler portion of the heat source. An example of a feed mechanism capable of individual feed rates for three continuous filler materials is shown in FIG. 6. Each filler wire 10a–10c is fed through a respective filler guide nozzle 16a–16c by respective single-groove drive roll pairs 20a–20c rotatably mounted on driven shafts 22. The three filler wires can be aimed such that their distal ends are lined up or lie at the vertices of a triangle, as in the filler guide nozzle assembly 12E shown in FIG. 7. As an example, with an arc as the heat source, the anode (work)-biased locations of the filler wires are effectively cooler due to both the decreasing axial and radial temperature distributions of the arc toward the anode, the decreasing energy density of the arc with distance from the electrode tip, as well as the "shadowing" of the filler wire closest to the electrode tip.

In a preferred design of the thermally-biased pattern, the filler sizes are preselected so as to maximize the melt-off rate according to the temperature distribution. The selected sizes should take into account the smallest filler wire that can be fed without buckling or other practical problems, and the largest filler wire that will fit into the very thin nozzle required for the preferred reduced-width joint design. For the chosen filler wire sizes, the melt-off rates can be subsequently optimized for the actual heat source and heat sink conditions of the joining process by making relatively small changes to their respective feed rates without significant degradation of the unique thermal efficiency for filler melting obtained with the combination of the number of multiple fillers, the filler position, and the filler size.

Figure 7:
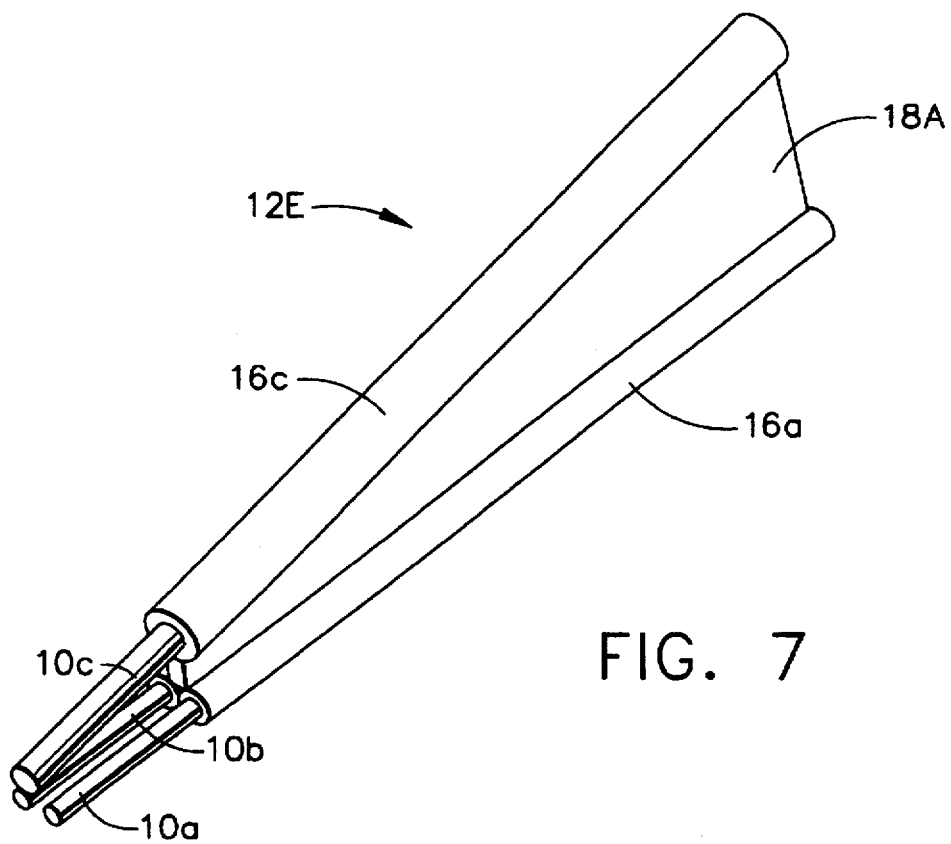
FIG. 7 is a schematic showing an isometric view of a three-filler-material nozzle assembly having a segmented design with convergent spacer and stiffener in accordance with a seventh preferred embodiment.
Figure 8A:
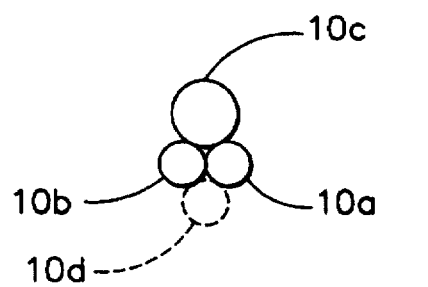
FIGS. 8A–8C are diagrams depicting three examples of alternate polygonal arrangements of multiple continuous filler materials in accordance with the invention.
Figure 8B:
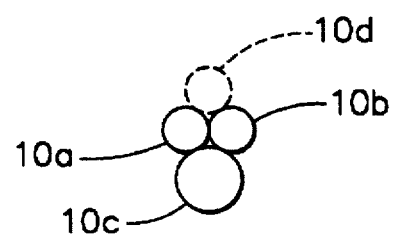
Figure 8C:
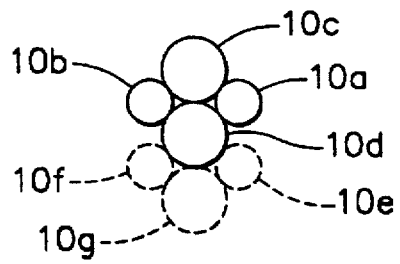

An optional method for using the triangular pattern of FIG. 7 provides for individual adjustment of the feed rates of the smaller filler materials relative to each other, as well as relative to the larger filler. This option utilizes the benefits of the higher surface area and lesser thickness of finer fillers, with the preferred filler geometrical pattern for improved heat utilization for filler melting. In addition, the combined benefits include the capability to tailor the alloy content of the primary (typically larger) filler with the secondary and/or tertiary (typically smaller) fillers, as well as to control characteristics of the molten pool, such as surface-wetting and joint-penetration of the primary filler with active elements contained in the additional fillers. The locations of the primary and secondary fillers can be transposed depending on the relative melting points and sizes of the fillers Additional triangular/polygonal patterns, as shown in FIGS. 8A–8C, can be used to advantage to improve the melt-off efficiency at predetermined heat input levels, and therefore to increase the joining productivity. FIGS. 8A and 8B show triangular filler configurations consisting of one large filler wire 10c and two small filler wires 10a and 10b, with an optional third small filler wire 10d indicated by dashed circles. In FIG. 8c, the filler configuration consists of two large filler wires 10c and 10d and two small filler wires 10a and 10b arranged at the vertices of a parallelogram, and optional third and fourth small filler wires 10e and 10f and third large filler wire 10g indicated by dashed circles. These patterns, having more than three fillers, may use simple parallel-type filler drive mechanisms, each feeding more than one filler piece. Alternatively, they can be operated with individual feed drives to tailor the feed speed of one or more filler materials in a more sophisticated design.

In accordance with the present invention, the edge configuration of the convergent spacer/stiffener plate can be curved or straight. For the nozzle assembly 12F shown in FIGS. 9 and 9A, the preferred edge shape of the spacer/stiffener 18B is curved in the plane of the nozzle. This curvature readily allows the attached flexible tubing 16a–16c to be curved. Curved holes for the filler guide path are preferred over straight holes for the following functional reasons:

a) One benefit of curved holes is that they maintain planar alignment and convergence of the typically curved filler materials as they exit the nozzles (see FIG. 9A). The remaining curvature ("cast") of the fillers after they have been unwound from a spool can lead to significant deviation from their respective aim positions if the direction of the curvature is allowed to find its own azimuthal position with respect to the axis of the nozzle hole.

b) A second benefit of the curved nozzle is the significantly shorter length of nozzle that is required to reach from the outside of a joint to the root area. This feature becomes more important as either the thickness of the materials being joined increases, or as the filler entry angle (with respect to the surface of the root) decreases. A nozzle assembly 18A having a convergent aim point design is shown in dashed lines in FIG. 9 for comparison with nozzle assembly 18B having a filler cast control and convergent aim design.

c) A third benefit is that as the curvature of the nozzle approaches the approximate curvature of the filler (rather than forcing the filler to a straight configuration within the nozzle), the sliding friction between the filler and the filler nozzle diminishes. This reduction in friction allows the reliable feeding of finer (more thermally efficient melting) filler materials without the inherently increased risk of buckling at unsupported portions of the length in axial compression, such as occurs downstream of the feeder mechanism.

d) A fourth benefit is that the preferred shorter nozzle, as described in ¶ b) above, will be lighter for a predetermined cross-sectional shape, in turn reducing the load requirements for stable positioning for other manipulators of the torch assembly, such as oscillation and voltage control actuators.

e) A fifth benefit for curved, shorter nozzles is that they are stiffer and can therefore maintain an improved filler material aim point during rough handling or use, for a predetermined cross-sectional shape of the nozzle.

f) A sixth benefit, applicable to multiple-filler-type nozzles, is that when the filler holes are located on opposite edges of a flat stiffener having a different radius of curvature on each edge, fillers having different degrees of curvature ("cast") can be selectively fed through the hole having the closest match in curvature, in turn obtaining the benefit noted in ¶ c).

Another preferred embodiment of the invention is depicted in FIGS. 10A and 10B. In contrast to the triangular electrode/stiffener 28 seen in FIG. 5A, the electrode/stiffener 50 has convex edges 52 and 52' along its lowermost portion. Electrode/stiffener 50 comprises a blade 54 and a shank 56, each of which is separately replaceable. The blade has a plurality of throughholes 58 which receive respective crimped retainer sleeves 60. Each sleeve is crimped (see FIG. 10C) to retain the sleeve in a respective hole and to retain a respective ceramic ball 62 in the sleeve. In the embodiment shown in FIG. 10B, the ceramic ball 62 has a diameter greater than the thickness of the electrode/stiffener 50. Alternatively, the retainer sleeves can be asymmetrically formed to hold smaller balls so that some balls protrude on only one side of the electrode/stiffener and the other balls protrude on only the other side of the electrode/stiffener. In either case, the balls act as rolling insulating standoffs. The balls must be positioned and sized so that the balls on each side of the electrode/stiffener contact the opposing groove sidewall while the electrode/stiffener itself is separated from the groove sidewall by a separation gap sufficient to prevent sidewall arcing.

In accordance with the embodiment shown in FIG. 10A, a pair of nozzles 64 and 64', which can be used, e.g., to supply local cover gas, are welded to the respective convex edges 52 and 52' of electrode/stiffener 50. A pair of hot-wire guide nozzles 66 and 66' are in turn joined to gas nozzles 64 and 64'. As shown in FIG. 10B, hot-wire guide nozzle 66 has an electrical conductor 68 which surrounds the filler wire 10a and is in turn surrounded by an electrical insulator 70. The insulator 70 is encased in structural tubing 72, which is welded to gas nozzle 64. Conductor 68 is used to pre-heat the filler wire 10a before it is melted by the arc from electrode/stiffener 50. Nozzle 66' is similarly constructed to pre-heat the filler wire 10b. Preheating of the filler wire reduces the amount of heat input into the weld joint and heat affected zones thereof by the electrode arc, which in turn reduces the level of residual stress in the weld.

FIG. 11A shows a variation on the embodiment of FIG. 10A, in which the ceramic ball standoffs are replaced by ceramic roller standoffs 74 rotatably mounted on bent wires 76 attached to the edges, e.g., by welding. The standoffs depicted by dashed lines are optional. The edges of the rollers are radiused to prevent the rollers from snagging on rough surfaces. In the embodiments shown in FIGS. 11B and 11C, each roller 74 has a diameter greater than the thickness of the electrode/stiffener 50 and is arranged symmetrically relative to the midplane of the electrode/stiffener 50. Alternatively, a plurality of bent wires 76 can be canted away from the plane of the electrode/stiffener on both sides thereof and on both edges. Each bent wire carries a roller standoff which can have a diameter less than the thickness of the electrode/stiffener. One set of rollers extends on one side of the electrode/stiffener and the other rollers extend on the other side of the electrode/stiffener. In either case, the rollers act as insulating standoffs. The rollers must be positioned and sized so that the rollers on each side of the electrode/stiffener contact the opposing groove sidewall while the electrode/stiffener itself is separated from the groove sidewall by a separation gap sufficient to prevent sidewall arcing.

FIG. 11B shows a roller standoff attached to a hot wire nozzle of the type previously shown in FIG. 10B. FIG. 11C shows a roller standoff attached to an alternative hot wire nozzle comprising a conducting tube 68' welded to gas nozzle 64. The conducting tube 68' is electrically insulated from the electrode/stiffener 50 by means of an electrical insulator 80 arranged between the gas nozzle 64 and the electrode/stiffener 50.

Many of the benefits of the invention for a joining application can also be realized for a cladding application where the thickness of the filler material nozzle is not of great concern. These include all of the technical and productivity benefits for joining, except for those which relate specifically to the very thin shape of the nozzle apparatus.

Full size, functional prototypes of the multiple-filler-material nozzle assemblies as shown in FIGS. 2, 3A, 7 and 9 have been fabricated. Various material combinations suitable for production joining applications were used to fabricate these prototype units. These combinations include metal carbide tubing with carbide stiffeners (two-hole type nozzle), hardened stainless steel tubing with tool steel stiffeners (two-hole and three-hole, triangular pattern type nozzles), hardened stainless steel tubing without stiffeners (three-hole, in-line pattern type nozzle, with the center tube taking the place of the stiffener), and stainless steel tubing with carbide stiffener (three-hole, triangular pattern type nozzle).

The multiple-hole nozzles have been evaluated with Type ER 347 stainless steel wire having diameters of 0.015, 0.016 and 0.017 inch, Type ER 308L stainless steel wire having diameters of 0.020, 0.023 and 0.025 inch, Inconel Type ER 82 wire having diameters of 0.020, 0.025 and 0.030 inch, and Type ER 70S6 carbon steel having a diameter of 0.023 inch. For GTAW use, the three-hole nozzles were assembled with the larger-diameter hole closest to the planned location of the non-consumable electrode (which is the hottest, highest energy density portion of the heat source when the arc is present), and with the smaller-diameter hole furthest from the electrode. These patterns were fabricated in both the straight and the preferred curved designs. The two-hole nozzles were assembled with either two equal-diameter fillers, or with larger and smaller size fillers with the larger one selected to be closest to the heat source. This hole-size position arrangement can be inverted for fillers with significantly different melting properties, so that the more difficult to melt filler is in closer proximity to the heat source regardless of its relative size.

Assembly methods used for the prototypes included direct brazing or resistance spot welding of stainless steel foil straps (all carbide type), direct resistance spot welding or resistance spot welding of stainless steel foil straps (stainless steel tube, tool steel and carbide stiffener types), and high-temperature soldering (all stainless steel tube type). Feeding filler wire through each of these nozzle assemblies demonstrated that they provide the needed stiffness in the preferred thin profile for improved position control and remote viewing capability, and the correct angular convergence of the wire aim positions.

To adapt the basic designs and most of the options and variations of the multiple filler material invention, very little equipment modification is necessary since commercially available power supplies and welding heads have capability for alternating-period, parallel-alignment dual-wire feed (rather than simultaneous-period, opposed-alignment feed). These systems can be easily rewired to run in an electrically parallel motor circuit, operated by the existing single controller. In this configuration, the presently available motors would simultaneously feed the multiple ports of a single nozzle, rather than the existing design of alternately feeding two single-port nozzles.

The relative speeds of each feeder in a parallel system can be simply adjusted with a series-wired trim potentiometer, reducing the motor voltage (and therefore the speed) of a "slave" unit relative to the programmed "master" unit. Since each feeder in the existing parallel system is identical, either one of the units can be chosen as the "slave" with the other as the "master" unit, or they can be run at equal speeds with a selectable ratio between their respective drive wheels.

In addition to providing capability to tailor the composition of the deposited filler in joints between materials having filled grooves, the invention can also be used to deposit claddings having custom-alloyed compositions using the in-situ alloying method with standard-alloy filler stock.

The foregoing preferred embodiments of the invention have been disclosed for the purpose of illustration. Variations and modifications of the disclosed method will be readily apparent to practitioners skilled in the art of joining. All such variations and modifications which do not depart from the concept of the present invention are intended to be encompassed by the claims set forth hereinafter. For example, the multiple nozzles can be mounted so that the respective filler materials exit the nozzle outlets in parallel or at an acute angle with respect to each other. As used in the claims, the term "acute angle" means an angle <90°, including 0° (i.e., in parallel). In addition, the roller standoffs of the invention can be mounted directly to the edges of a flat electrode which does not perform the dual function of supporting gas and filler wire nozzles.

What is claimed is:

1. A multiple-filler-material guide nozzle assembly having a non-circular cross-sectional shape adapted to fit in a very-reduced-width weld groove, comprising:

a first nozzle for guiding a first filler material to a first desired location inside the weld groove, said first nozzle having a first outlet for said first filler material at a distal end thereof;

a second nozzle for guiding a second filler material to a second desired location inside the weld groove, said second nozzle having a second outlet for said second filler material at a distal end thereof; and stiffener means for maintaining a fixed positional relationship between said first and second outlets of said first and second nozzles such that said first and second filler materials exit said first and second outlets respectively, wherein said stiffener means comprise a planar member having first and second edges, said first nozzle being connected to said first edge and said second nozzle being connected to said second edge.

2. The multiple-filler-material guide nozzle assembly as defined in claim 1, wherein each of said first and second nozzles is curved.

3. The multiple-filler-material guide nozzle assembly as defined in claim 1, wherein said first nozzle has a channel with a first diameter and said second nozzle has a channel with a second diameter, said first diameter being different than said second diameter.

4. The multiple-filler-material guide nozzle assembly as defined in claim 1, wherein said first nozzle has a channel with a first cross section and said second nozzle has a channel with a second cross section, said first cross section being different than said second cross section.

5. A multiple-filler-material guide nozzle assembly having a non-circular cross-sectional shape adapted to fit in a very-reduced-width weld groove, comprising:

a first nozzle for guiding a first filler material to a first desired location inside the weld groove, said first nozzle having a first outlet for said first filler material at a distal end thereof;

a second nozzle for guiding a second filler material to a second desired location inside the weld groove, said second nozzle having a second outlet for said second filler material at a distal end thereof; and means for maintaining a fixed positional relationship between said first and second outlets of said first and second nozzles such that said first and second filler materials exit said first and second outlets respectively at a predetermined angle with respect to each other, wherein said means for maintaining a fixed positional relationship between said first and second outlets of said first and second nozzles comprise a non-consumable electrode blade.

6. A system for welding in a very-reduced-width weld groove, comprising:

a welding torch;

a welding electrode extending from said welding torch and adapted to fit in the weld groove; and a multiple-filler-material guide nozzle assembly having a non-circular cross-sectional shape adapted to fit in the weld groove, comprising:

a first nozzle for guiding a first filler material to a first desired location inside the weld groove, said first nozzle having a first outlet for said first filler material at a distal end thereof;

a second nozzle for guiding a second filler material to a second desired location inside the weld groove, said second nozzle having a second outlet for said second filler material at a distal end thereof; and support means for maintaining a fixed positional relationship between a portion of said first nozzle which penetrates into the weld groove and a portion of said second nozzle which penetrates into the weld groove such that said portions of said first and second nozzles penetrating into the weld groove generally lie in a plane, wherein said nozzle assembly is configured and dimensioned to fit in the weld groove only when said plane is generally perpendicular to a width direction of the weld groove.

7. The welding system assembly as defined in claim 6, wherein said support means comprise means for joining said first nozzle to said second nozzle.

8. The welding system assembly as defined in claim 6, wherein said support means comprise a spacer made of stiff material, said first and second nozzles being attached to said spacer.

9. The welding system assembly as defined in claim 6, wherein said support means comprise means for attaching said first and second nozzles to said electrode.

10. The welding system assembly as defined in claim 6 wherein each of said first and second nozzles is curved.

11. The welding system assembly as defined in claim 6, wherein said first nozzle has a channel with a first diameter and said second nozzle has a channel with a second diameter, said first diameter being different than said second diameter.

12. The welding system assembly as defined in claim 6, wherein said first nozzle is electrically connected to a power supply.

13. A filler material guide nozzle assembly adapted to fit in a weld groove, comprising:

a first curved nozzle for guiding a distal end of a first unwound filler wire to a first desired location inside the weld groove, said first curved nozzle having an outlet for said first unwound filler wire at a distal end thereof;

a second curved nozzle for guiding a distal end of a second unwound filler wire to a second desired location inside the weld groove, said/second curved nozzle having an outlet for said second unwound filler wire at a distal end thereof; and support means for maintaining a fixed positional relationship between a portion of said first curved nozzle which penetrates into the weld groove and a portion of said second curved nozzle which penetrates into the weld groove.

14. A method for welding in a very-reduced-width weld groove having a bottom, comprising the steps of:

inserting a welding electrode in the weld groove, said welding electrode having a tip separated from the bottom of the weld groove by a gap;

generating an electric arc across the gap;

feeding a first filler material to a first locus in the weld groove, said first filler material at said first locus being melted by heat from said arc;

feeding a second filler material to a second locus in the weld groove, said second filler material at said second locus being melted by heat from said arc, said first and second loci being situated such that said molten first and second filler materials form a weld puddle; and allowing said weld puddle of molten first and second filler materials to fuse;

wherein said first and second filler materials are different in composition.

15. The method as defined in claim 14, wherein at least one of said first and second filler materials contains at least some noble metal.

16. The method as defined in claim 14, wherein said first and second filler materials are fed at different feed rates.

17. The method as defined in claim 14, wherein said first and second filler materials are wires having different diameters.

18. A welding electrode assembly comprising a planar electrode, a straight member supported by said electrode, and a roller standoff rotatably mounted on said straight member, said roller having a circular cylindrical surface and being made of electrically insulating material.

19. A hot-wire welding electrode assembly comprising a planar electrode having a thickness, a hot filler wire nozzle supported by said electrode and lying in a plane of said electrode, and an electrical insulator, said hot filler wire nozzle comprising an electrical conductor, and said electrical insulator being arranged to electrically isolate said electrical conductor from said electrode.

20. A system for welding in a very-reduced-width weld groove, comprising:

a welding torch;

a welding electrode extending from said welding torch and adapted to fit in the weld groove, said welding electrode comprising a tip;

a first curved filler material guide nozzle adapted to fit in the weld groove, said first curved guide nozzle having an outlet for a first filler material at a distal end thereof;

a second curved filler material guide nozzle adapted to fit in the weld groove, said second curved guide nozzle having an outlet for a second filler material at a distal end thereof; and support means for maintaining a fixed positional relationship between a portion of said first curved filler material guide nozzle which penetrates into the weld groove and a portion of said second curved filler material nozzle which penetrates into the weld groove such that said portions of said first and second curved filler material guide nozzles generally lie in a plane, wherein said nozzle assembly is configured and dimensioned to fit in the weld groove only when said plane is generally perpendicular to a width direction of the weld groove.

21. A system for welding in a very-reduced-width weld groove, comprising:

a welding torch;

a welding electrode extending from said welding torch and adapted to fit in the weld groove, said electrode having a tip;

a first nozzle extending into the weld groove for guiding a first filler material toward a point of convergence, said first nozzle having a first outlet for said first filler material at a distal end thereof; and a second nozzle extending into the weld groove for guiding a second filler material toward said point of convergence, said second nozzle having a second outlet for said second filler material at a distal end thereof, wherein said first and second filler materials are concurrently melted by an arc from said electrode tip during feeding toward said point of convergence.

* * * * *